United States Patent [19]

Maenaka et al.

[11] Patent Number: 5,552,827
[45] Date of Patent: Sep. 3, 1996

[54] COLOR VIDEO CAMERA WITH A SOLID STATE IMAGE SENSING DEVICE

[75] Inventors: Akihiro Maenaka, Moriguchi; Yukio Mori, Yawata; Haruhiko Murata, Takatsuki; Hidefumi Okada, Daito; Hirokazu Ide, Osaka, all of Japan

[73] Assignee: Sanyo Electric Co., Ltd., Moriguchi, Japan

[21] Appl. No.: 298,548

[22] Filed: Aug. 30, 1994

[30] Foreign Application Priority Data

Aug. 31, 1993 [JP] Japan .................................. 5-216469
Dec. 27, 1993 [JP] Japan .................................. 5-332323
Apr. 18, 1994 [JP] Japan .................................. 6-078628

[51] Int. Cl.$^6$ ........................................ H04N 9/07
[52] U.S. Cl. ........................... 348/266; 348/649; 348/29
[58] Field of Search ................................. 348/266, 222, 348/240, 239, 704, 241, 273, 29, 30, 32, 649, 242; H04N 9/07, 5/228, 5/262, 3/223, 5/217, 3/14, 5/335, 9/04, 9/083

[56] References Cited

U.S. PATENT DOCUMENTS

| | | | |
|---|---|---|---|
| 4,951,125 | 8/1990 | Kojima et al. | 348/704 |
| 5,253,046 | 10/1993 | Shiraishi | 348/237 |
| 5,253,064 | 10/1993 | Yamamoto et al. | 348/240 |
| 5,325,182 | 6/1994 | Murata et al. | 348/663 |
| 5,333,055 | 7/1994 | Murata et al. | 348/239 |

Primary Examiner—Safet Metjahic
Assistant Examiner—Nina N. West
Attorney, Agent, or Firm—Armstrong, Westerman, Hattori, McLeland & Naughton

[57] ABSTRACT

A color video camera includes a CCD, and digital signals of 4 lines produced on the basis of an outputs from the CCD are applied to a selection circuit which selectively outputs digital signals of 3 lines. A horizontal interpolation circuit and a vertical interpolation circuit perform interpolation calculation on the basis of the digital signals, and outputs a plurality of horizontal color signals and a plurality of vertical color signals, respectively. A horizontal correlation detection circuit and a vertical correlation detection circuit evaluate a horizontal correlation value and a vertical correlation value of a specific pixel with respect to pixels around the specific pixel. Horizontal and vertical weighing coefficients are calculated by a coefficient calculation circuit in accordance with the correlation values, and the coefficients are applied to a weighted addition circuit which adds the horizontal color signals and the vertical color signals to each other for each color in accordance with the coefficients, and outputs the color signals of the specific pixel.

11 Claims, 12 Drawing Sheets

FIG. I(A) PRIOR ART
FIG. I(B) PRIOR ART
FIG. I(C) PRIOR ART
FIG. I(D) PRIOR ART
FIG. I(E) PRIOR ART
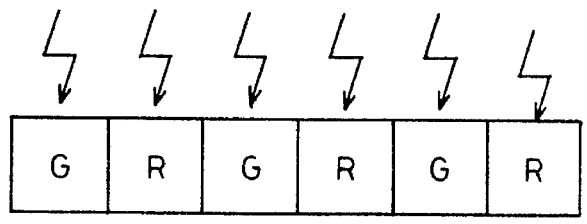
FALSE COLOR SIGNAL
FIG. I(F) PRIOR ART
FIG. I(G) PRIOR ART F I G. 3
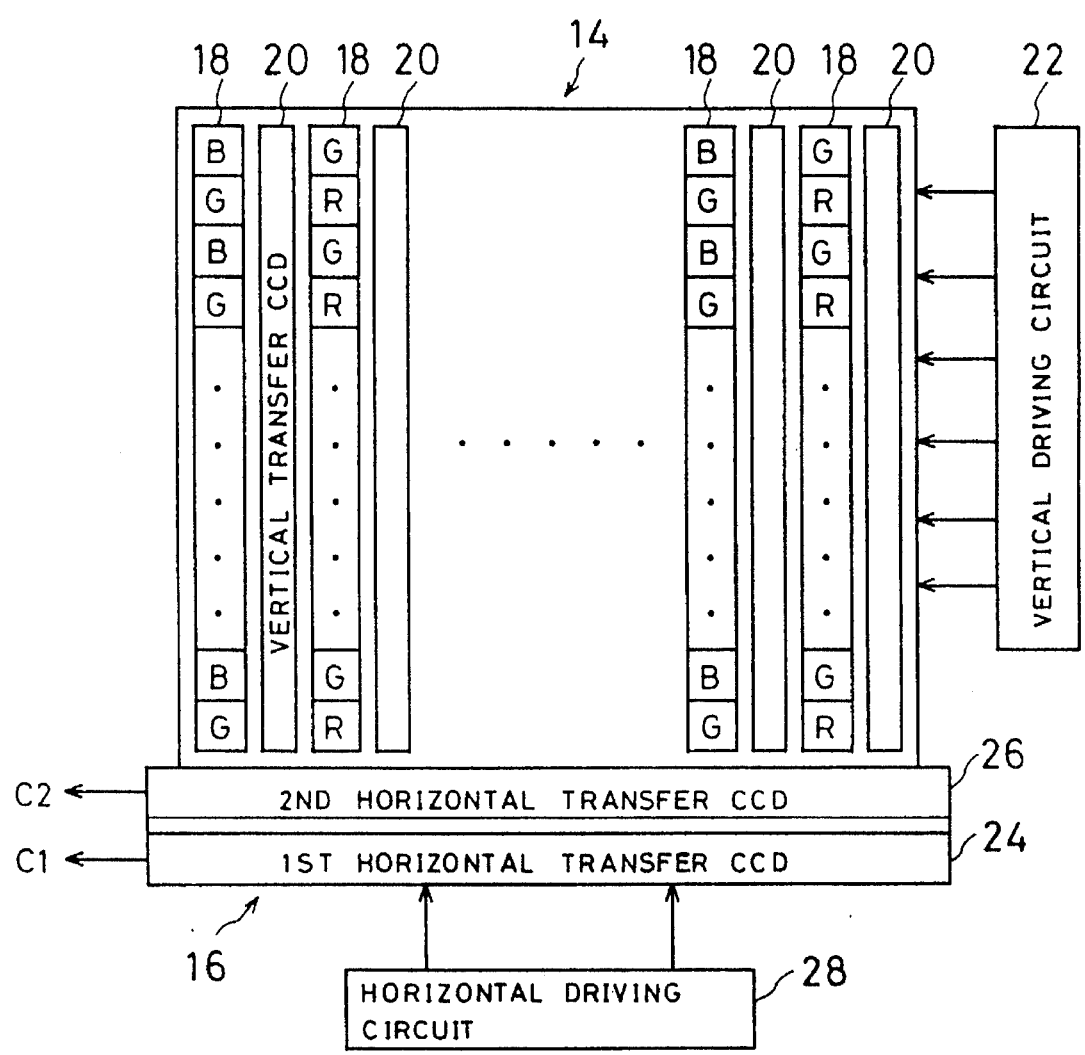

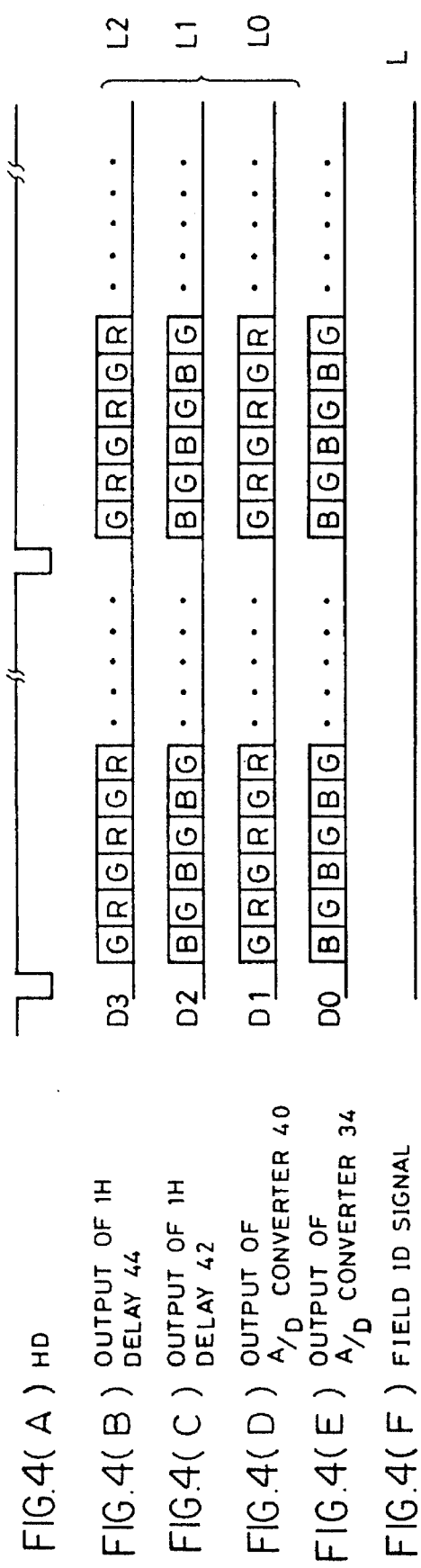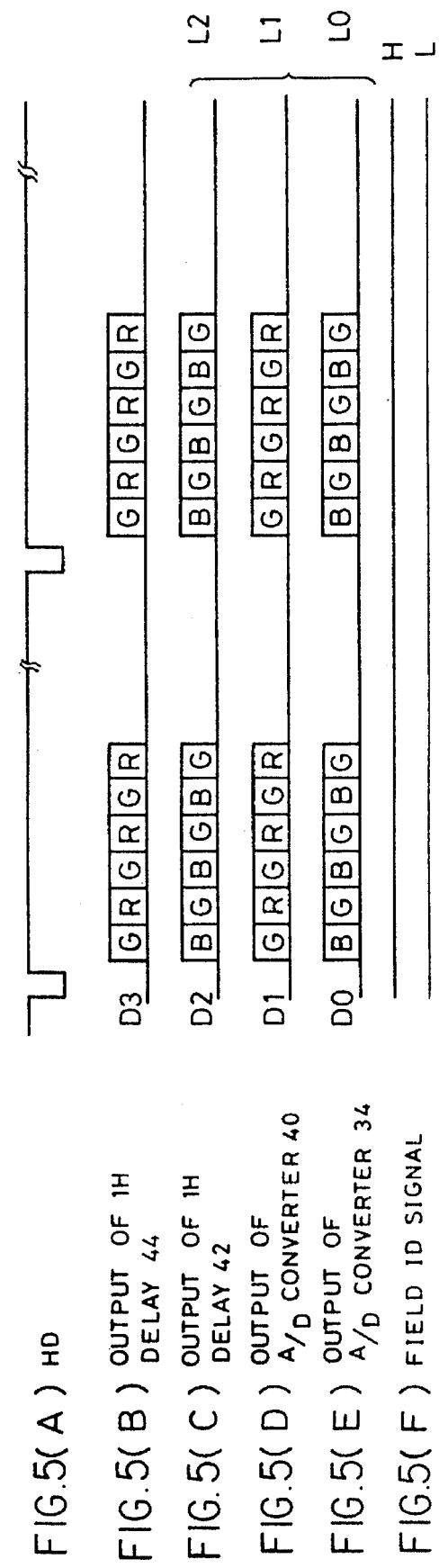

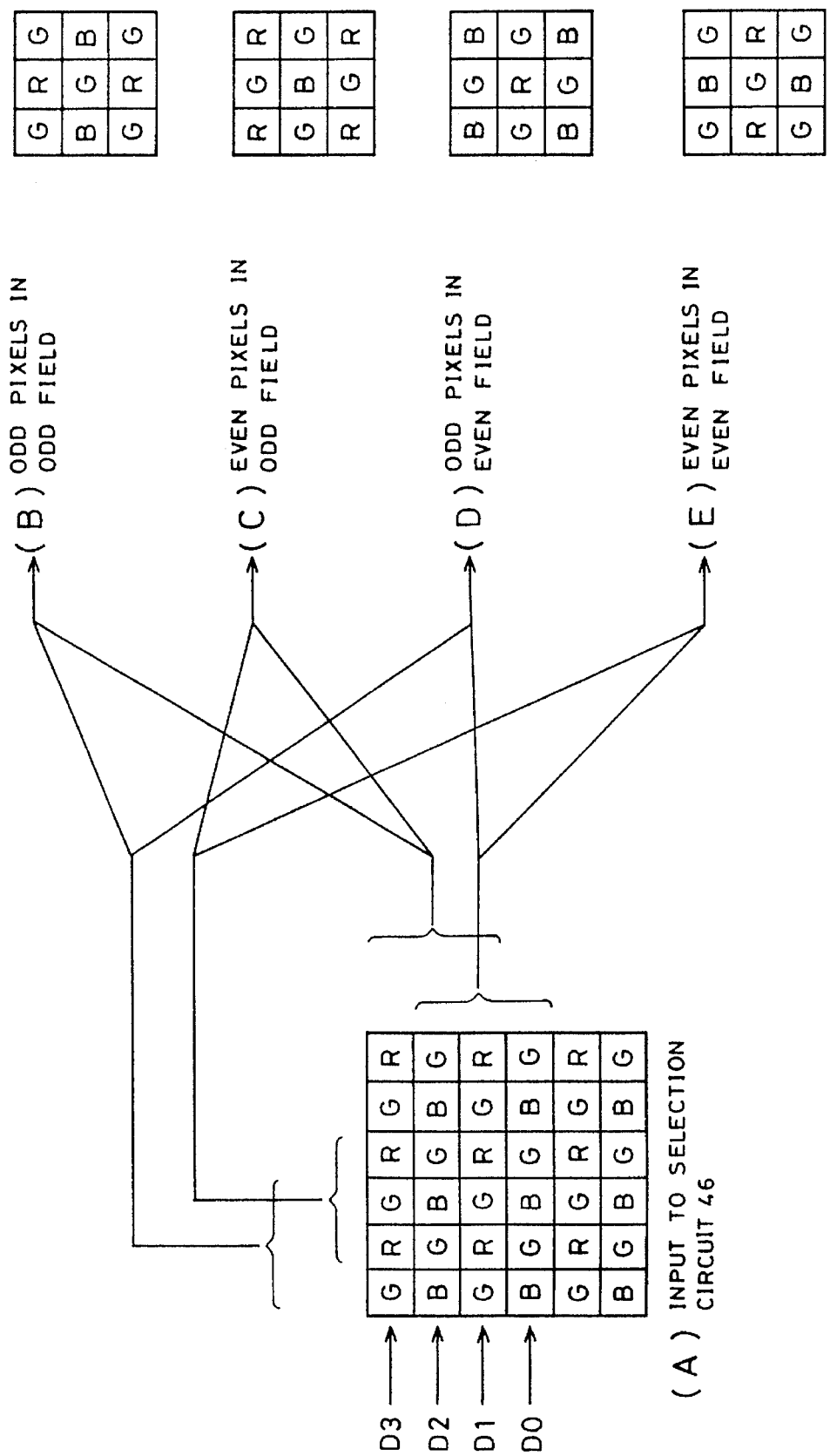

FIG. 8(A)

| G11 | R12 | G13 |
|-----|-----|-----|
| B21 | G22 | B23 |
| G31 | R32 | G33 |

FIG. 8(B)

| R11 | G12 | R13 |
|-----|-----|-----|
| G21 | B22 | G23 |
| R31 | G32 | R33 |

FIG. 13(A)

| B11 | G12 | B13 | G14 | B15 |
|-----|-----|-----|-----|-----|
| G21 | R22 | G23 | R24 | G25 |
| B31 | G32 | B33 | G34 | B35 |

FIG. 13(B)

| G11 | B12 | G13 | B14 | G15 |
|-----|-----|-----|-----|-----|
| R21 | G22 | R23 | G24 | R25 |
| G31 | B32 | G33 | B34 | G35 |

FIG. 15

| D11 | D12 | D13 |
|-----|-----|-----|
| D21 | D22 | D23 |
| D31 | D32 | D33 |

FIG. 9
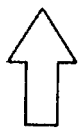 
 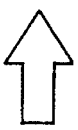
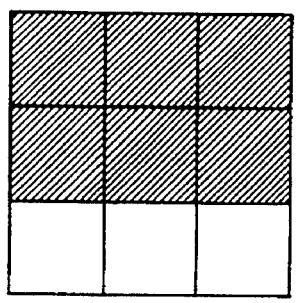

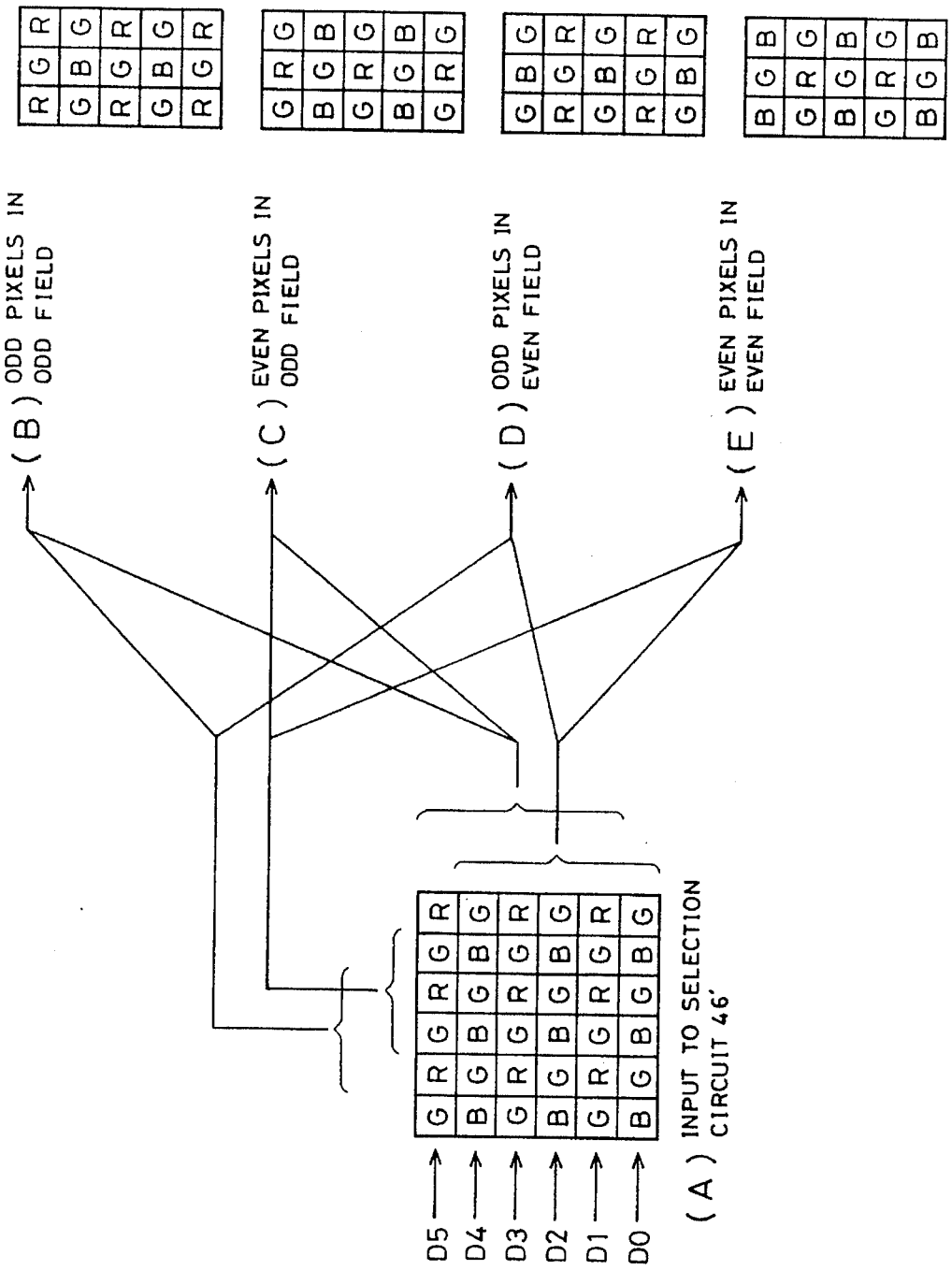

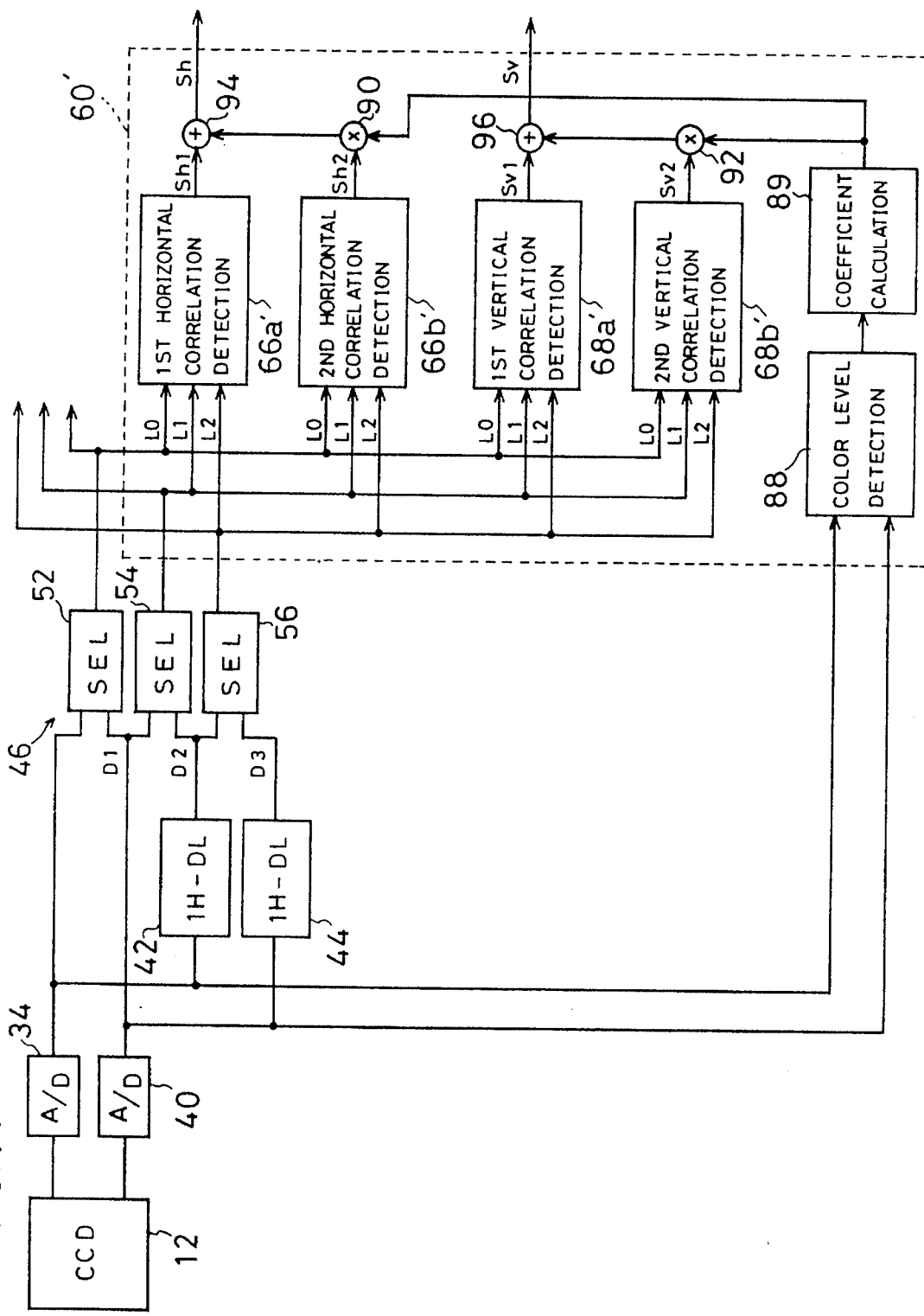

COLOR VIDEO CAMERA WITH A SOLID STATE IMAGE SENSING DEVICE

BACKGROUND OF THE INVENTION

1. Field of the Invention

The present invention relates to a color video camera. More specifically, the present invention relates to a color video camera which utilizes a solid-state image sensing device having a large number of pixels arranged in a matrix fashion and a plurality of color filters arranged in a mosaic fashion.

2. Description of the Prior Art

In such a kind of color video camera, a color filter of a predetermined color (for example, any one of R, G and B) is arranged for each pixel, and by processing signals from a solid-state image sensing device, a color separation is performed such that video signals of R, G and B can be produced.

A case where a color filter of G and a color filter of R are alternately arranged in a horizontal direction as shown in FIG. 1(B) is assumed, for example. Since no G signal is obtained from a specific pixel on which the color filter of R is arranged, by performing interpolation calculation with using G signals from pixels adjacent to the specific pixel, a G signal of the specific pixel is obtained. That is, by calculating an average of signals from the pixels of G which sandwich the pixel of R in FIG. 1(B), the G signal at the pixel of R can be obtained. As well known, such a method is a method utilizing a correlation in the horizontal direction. However, it is known that in such a simple interpolation method, a false color signal is produced at a boundary (edge) where a white portion and a black portion are adjacent to each other.

A case where an incident light shown in FIG. 1(A) is applied to the solid-state image sensing device having a color filter arrangement shown in FIG. 1(B) is assumed. The incident light suddenly changes from white to black as shown in FIG. 1(A). Signal levels from respective pixels at that time are shown in FIG. 1(C). The G signal and the R signal are "1.0", respectively, at the white portion and are "0", respectively, at the black portion. In such a case, if the above described interpolation method is applied, the G signal after interpolation and the R signal after interpolation become "1.0" and "0.5", and "0.5" and "0.0", respectively, at the boundary of the white portion and the black portion as shown in FIG. 1(D) and FIG. 1(E). On the other hand, the G signal and the It signal must originally have levels shown in FIG. 1(F) and FIG. 1(G). Therefore, it will be understood that in FIG. 1(D) and FIG. 1(E), false color signals are produced at the edge.

As a counter measure for such a false color signal, a method utilizing a low-pass filter, or a method suppressing a color signal at the boundary (edge) has been proposed. There is a prior art in connection to the latter method, which is Japanese Patent Application No. 4-68361 filed on Mar. 26, 1992, which is assigned to the same assignee of the present invention.

In the former method, a level of the false color signal can be lowered, but an area where the false color signal is produced is enlarged. Furthermore, in the latter method, a color signal which is to be originally obtained is suppressed together with the false color signal, and therefore, there is an occasion that no color is obtained at the boundary (edge).

SUMMARY OF THE INVENTION

Therefore, a principal object of the present invention is to provide a novel color video camera.

Another object of the present invention is to provide a color video camera in which it is possible to prevent a false color signal from being produced.

Another object of the present invention is to provide a color video camera in which it is possible to prevent a false color signal from being produced and a color repeatability does not become bad.

A color video camera according to the present invention comprises: a solid-state image sensing device having a large number of pixels arranged in a matrix fashion and a plurality of color filters on the pixels in a mosaic fashion; an interpolation processing circuit which produces a plurality of color signals of a specific pixel on the basis of color signals of the specific pixels and color signals from pixels around the specific pixel outputted from the solid-state image sensing device; and a correlation detection circuit which detects a correlation of the specific pixel with respect to the pixels around the specific pixel on the basis of the color signals from the specific pixel and the pixels around the specific pixel and controls the interpolation processing circuit.

In a preferred embodiment, the interpolation processing circuit includes a horizontal interpolation circuit, a vertical interpolation circuit and a weighted addition circuit. The horizontal interpolation circuit outputs horizontal color signals Gh, Rh and Bh, and the vertical interpolation circuit outputs vertical color signals Gv, Rv and Bv. In the waited addition circuit, Gh and Gv, Rh and Rv, and Bh and Bv are added to each other, respectively. The correlation detection circuit outputs weighing coefficients Kh and Kv for the horizontal color signals and the vertical color signals, and the weighing coefficients are applied to the weighted addition circuit. In the weighted addition circuit, according to the weighing coefficients Kh and Kv, the horizontal color signals Rh, Gh and Bh and the vertical color, signals Rv, Gv, and BV are added to each other, respectively.

In accordance with the present invention, since the correlation of the specific pixel with respect to the pixels around the specific pixel is detected, and according to the correlation, the interpolation processing is controlled in the interpolation processing circuit, it is possible to prevent a false color signal which has been generated in the simple interpolation method of the prior art from being produced. Furthermore, since no low-pass filter is utilizes, a high-frequency region component is not reduced or attenuated, and therefore, a resolution is not lowered. Furthermore, since the color signal is not suppressed, the color repeatability does not become bad.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an illustrative view showing a fact that a false color signal is produced in the prior art;

FIG. 3 is a block diagram showing a solid-state image sensing device of FIG. 2 embodiment in detail;

FIG. 4 is a timing chart showing digital signals inputted to a selection circuit of FIG. 2 embodiment at an odd field, and a field identification (ID) signal;

FIG. 5 is a timing chart showing digital signals inputted to the selection circuit at an even field, and a field ID signal;

FIG. 7 is an illustrative view showing selection of pixels to be processed in FIG. 2 embodiment;

FIG. 8 is an illustrative view showing a specific pixel and pixels around time specific pixel;

FIG. 9 is an illustrative view showing a fact that no false color signal is produced in FIG. 2 embodiment;

FIG. 12 is an illustrative view showing selection of pixels to be processed in FIG. 10 embodiment;

FIG. 13 is an illustrative view showing a specific pixel and pixels around the specific pixel;

FIG. 14 is a block diagram showing another embodiment according to the present invention; and FIG. 15 is an illustrative view showing a correlation detection method in FIG. 14 embodiment.

DETAILED DESCRIPTION OF THE PREFERRED EMBODIMENTS

Figure 2:
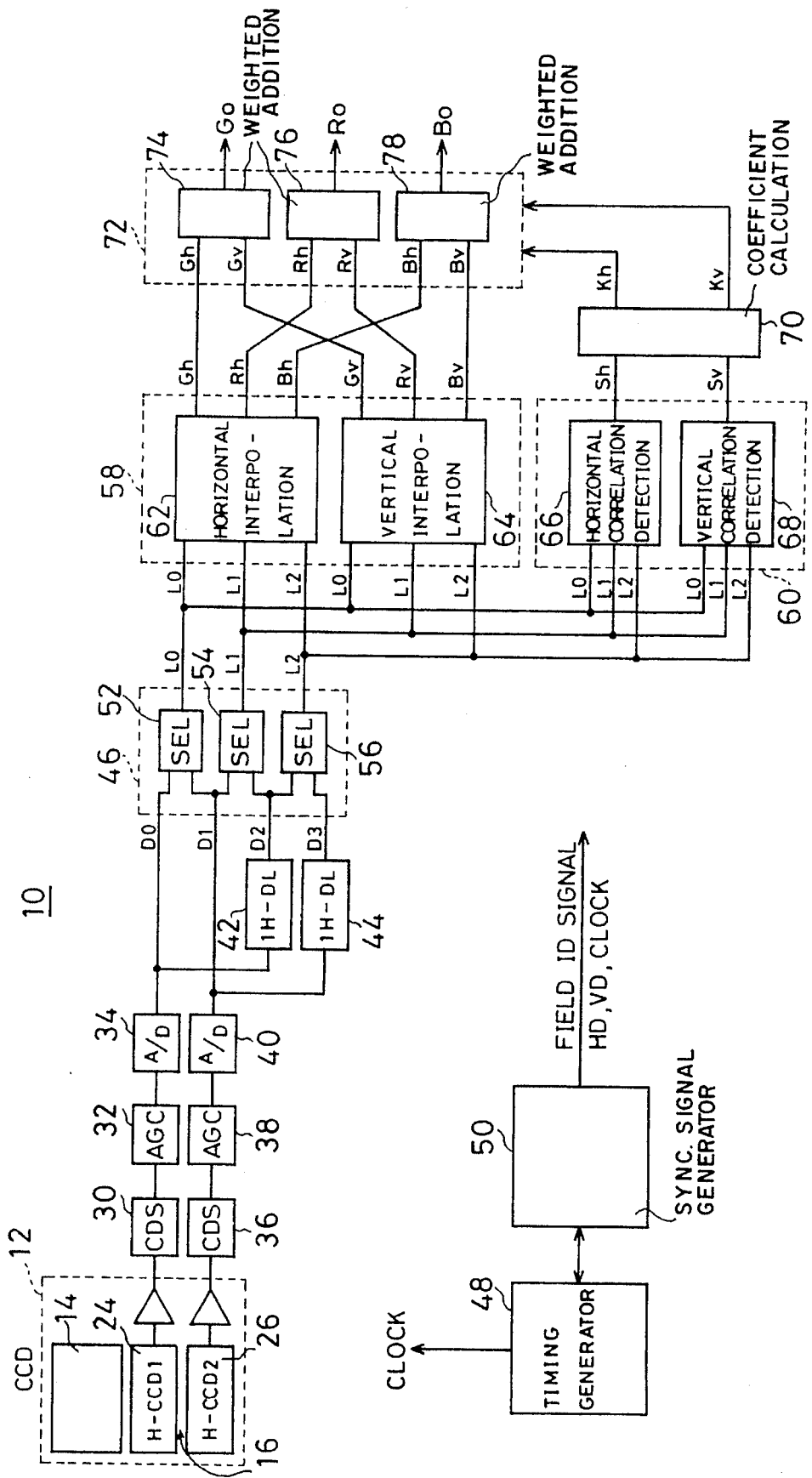
FIG. 2 is a block diagram showing one embodiment according to the present invention.

With referring FIG. 2, a color video camera 10 of this embodiment shown includes a solid-state image sensing device 12. The solid-state image sensing device 12 includes a CCD image sensor, for example. The solid-state image sensing device 12 includes an image sensing portion 14 and a horizontal transfer portion 16. As shown in FIG. 3, the image sensing portion 14 includes photo-diodes 18, 18, 18 which convert an incident light into electric signals (photo-electric conversion), and on the photo-diodes 18, color filters of respective colors which are different from each other between adjacent pixels are arranged. As seen from FIG. 3, the color filter of each color is arranged in a mosaic fashion. The image sensing portion 14 further includes a vertical transfer CCDs 20, 20, 20, . . . which are driven by a vertical driving circuit 22. The horizontal transfer portion 16 includes dual-channel structure composed of a first horizontal transfer CCD 24 and a second horizontal transfer CCD 26, whereby the electric signals of two (2) lines are simultaneously outputted. The first horizontal transfer CCD 24 and the second horizontal transfer CCD 26 are driven by a horizontal driving circuit 28.

The electric signal outputted from the first horizontal transfer CCD 24 of the solid-state image sensing device 12 is applied to an A/D converter 34 via a correlation double sampling circuit (CDS) 30 and an automatic gain control circuit (AGC) 32, and converted into a digital signal. Likely, the electric signal from the second horizontal transfer CCD 26 is applied to an A/D converter 40 via a CDS 36 and an AGC 38, and converted into a digital signal. That is, the electric signals from the solid-state image sensing device 12 are converted into the digital signals by the A/D converters 34 and 40.

The digital signals outputted from the A/D converters 34 and 40 are applied to 1 H delay circuits 42 and 44, and to a selection circuit 46. Each of the 1 H delay circuits 42 is a memory capable of storing a digital signal of 1 H (1 horizontal period), and outputs a digital signal delayed by 1 H. In addition, writing and reading to and from the 1 H delay circuits 42 and 44 are performed in synchronous with the horizontal transfer in the solid-state image sensing device 12. Therefore, a timing generator 48 and a synchronization signal generator 50 are provided. The timing generator 48 outputs a clock signal which is applied to the horizontal driving circuit 28 (FIG. 3) and the 1 H delay circuits 42 and 44. The synchronization signal generator 50 also receives the clock signal from the timing generator 48 so as to operate in synchronous with the timing generator 48, and outputs a horizontal synchronization signal HD, a vertical synchronization signal VD, the clock signal, and a field identification (ID) signal representative of an odd field or an even field.

The selection circuit 46 includes three (3) selectors 52, 54 and 56, and the digital signals D0 and D1 from the A/D converters 34 and 40 are directly applied to the selector 52. The selector 54 receives the digital signal D1 from the A/D converter 40 and the digital signal D2 from the 1 H delay circuit 42, and the selector 56 receives the digital signals D2 and D3 from the 1 H delay circuits 42 and 44.

The selection circuit 46 selects digital signals L0, L1, L2 of three (3) lines from the digital signals D0, D1, D2 and D3 of four (4) lines, one of the three lines being changed in accordance with the odd field or the even field. More specifically, when the field identification signal indicates the odd field, that is, when the field identification signal is the low level (FIG. 4(F)), the selector 52 selects the digital signal D1, the selector 54 selects the digital signal D2, and the selector 56 selects the digital signal D3. That is, since the field identification signal is the low level as shown in FIG. 4(F), the selection circuit 46 outputs the digital signals D1, D2 and D3 shown in FIG. 4(D), FIG. 4(C), FIG. 4(B) as the output signals L0, L1 and L2.

When the field identification signal indicates the even field, that is, when the field identification signal is the high level (FIG. 5(F)), the selector 52 selects the digital signal D0, the selector 54 selects the digital signal D1, and the selector 56 selects the digital signal D2. That is, at the even field, since the field identification signal becomes the high level as shown in FIG. 5(F), time selection circuit 46 outputs the digital signals D0, D1 and D2 shown in FIG. 5(E), FIG. 5(D) and FIG. 5(C) as the output signals L0, L1 and L2.

The output digital signals L0, L1 and L2 from the selection circuit 46 are applied to an interpolation circuit 58 and a correlation detection circuit 60. The interpolation circuit 58 includes a horizontal interpolation circuit 62 and a vertical interpolation circuit 64, and the correlation detection circuit 60 includes a horizontal correlation detection circuit 66 and a vertical correlation detection circuit 68.

The horizontal interpolation circuit 62 performs the interpolation which is suitable for a case where a correlation in the horizontal direction is strong, and the vertical interpolation circuit 64 performs the interpolation suitable for a case where a correlation in the vertical direction is strong. A fact that the correlation in the horizontal direction is strong means a case as such a thin lateral-striped pattern, for example, the correlation in the horizontal direction is strong but the correlation in the vertical direction is very weak. Furthermore, a fact that the correlation in the vertical direction is strong means a case as such a thin longitudinal-striped pattern, for example, the correlation in the vertical direction is strong but the correlation in the horizontal direction is very weak. Then, from the horizontal interpolation circuit 62, color signals Gh, Rh and Bh of a specific pixel obtained through the horizontal interpolation calculation are outputted, and color signals Gv, Rv and Bv of the specific pixel obtained through the vertical interpolation calculation are outputted from the vertical interpolation circuit 64. In addition, the interpolation calculation of the interpolation circuit 58 will be described later in detail.

On the other hand, the horizontal correlation detection circuit 66 included in the correlation detection circuit 60 outputs a horizontal correlation value Sh, and the vertical correlation detection circuit 68 outputs a vertical correlation value Sv. The correlation value data Sh and Sv are applied to a coefficient calculation circuit 70. In the coefficient calculation circuit 70, a horizontal weighing coefficient Kh and a vertical weighing coefficient Kv are calculated on the basis of the correlation values Sh and Sv. In addition, calculation methods of the correlation values and the weighing coefficients will be described later in detail.

The color signals Gh, Rh and Bh, and Gv, Rv and Bv from the interpolation circuit 58 are applied to a weighted addition circuit 72. The weighted addition circuit 72 also receives the weighing coefficients Kh and Kv from the coefficient calculation circuit 70. The weighted addition circuit 72 performs an addition of the color signals of the same color, and then, outputs color signals Go, Ro and Bo of the specific pixel. Therefore, the weighted addition circuit 72 includes three (3) weighted adder 74, 76 and 78. The adder 74 receives the color signal Gh from the horizontal interpolation circuit 62 and the color signal Gv from the vertical interpolation circuit 64, and the adder 76 receives the color signal Rh from the horizontal interpolation circuit 62 and the color signal Rv from the vertical interpolation circuit 64, and the adder 78 receives the color signal Bh from the horizontal interpolation circuit 62 and the color signal Bv from the vertical interpolation circuit 64. Then, each of the respective adders 74, 76 and 78 performs weighted addition of the horizontal direction color component and the vertical direction color component according to the weighing coefficients Kh and Kv, and outputs each of the color signals Go, Ro and Bo.

Thus, in FIG. 2 embodiment, on the basis of the correlation in the horizontal direction and the correlation in the vertical direction, the interpolation processing for separating the color signals is controlled.

Figure 6:
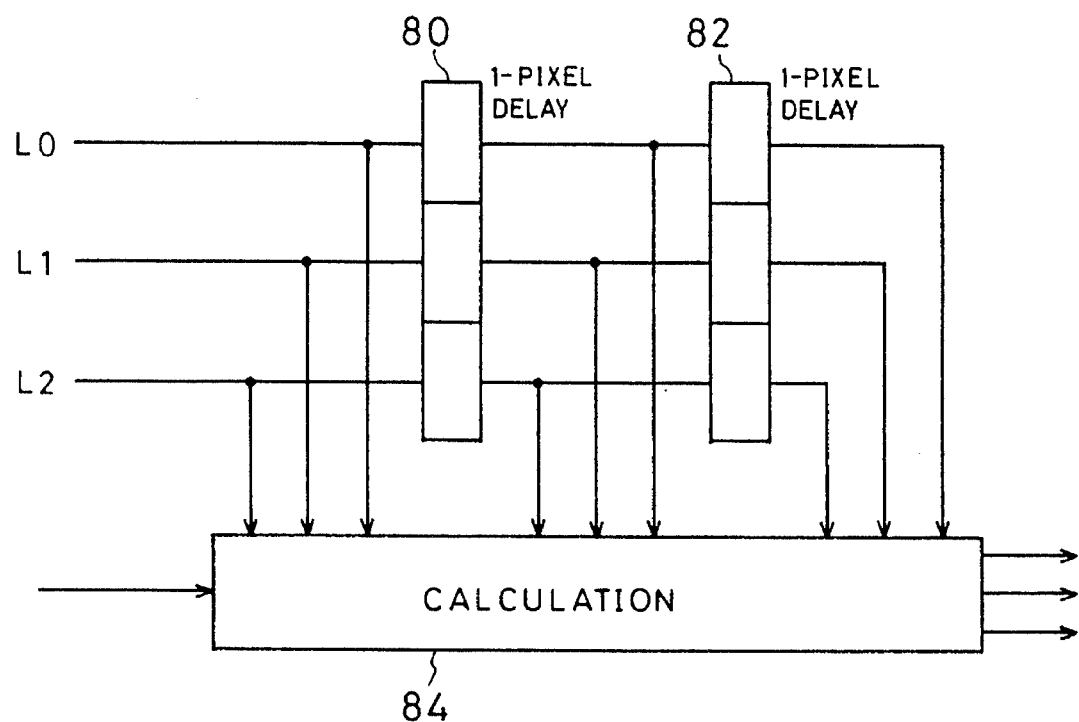
FIG. 6 is a block diagram showing each of respective circuits in FIG. 2 embodiment.

Next, the interpolation calculation in the interpolation circuit 58 will be described in detail, In FIG. 2 embodiment, the color signals Go, Ro and Bo are produced on the basis of the signals from nine (9) pixels. Each of the horizontal interpolation circuit 62 and the vertical interpolation circuit 64 includes a digital calculation circuit shown in FIG. 6. More specifically, the three digital signals L0, L1 and L2 selected by the selection circuit 46 are applied to 1-pixel delay circuits 80, and outputs of the 1-pixel delay circuits 80 are applied to 1-pixel delay circuits 82. Then, a calculation circuit 84 receives the digital signals L0, L1 and L2, and outputs from each of the 1-pixel delay circuits 80 and 82. Therefore, the signal of nine (9) pixels are applied to the calculation circuit 84 simultaneously.

In addition, the digital calculation circuit is utilized for each of the horizontal correlation detection circuit 66 and the vertical correlation detection circuit 68 (FIG. 2), a horizontal interpolation circuit 62' and a vertical interpolation circuit 64' (FIG. 9), a first horizontal correlation detection circuit 66a', a first vertical correlation detection circuit 66b', a second horizontal correlation detection circuit 68a' and a second vertical correlation detection circuit 68b' (FIG. 13), as similar to each of the horizontal interpolation circuit 62 and the vertical interpolation circuit 64. In addition, if five (5) pixels in the horizontal direction are required, the digital calculation circuit (FIG. 6) has to provided with further 1-pixel delay circuits of two stages, and if five (5) pixels in the vertical direction are required, one stage of the 1-pixel delay circuits must have five (5) delay cells in the vertical direction.

FIG. 7 is an illustrative view showing a relationship between a pixel arrangement of the solid-state image sensing device 12 (FIG. 2 and FIG. 3) and pixels selected by the selection circuit 46. As described above, in the odd field, the digital signals D1, D2 and D3 of three (3) lines are selected, and therefore, at an odd pixel in the odd field, the pixels which are selected by the selection circuit 46 become as shown in FIG. 7(B). At an even pixel in the odd field, the selected pixels become as shown in FIG. 7(C). On the other hand, in the even field, the digital signals D0, D1 and D2 of three (3) lines are selected, and therefore, at an odd pixel in the even field, the pixels which are selected by the selection circuit 46 become as shown in FIG. 7(D), and at even pixel in the even field, the selected pixels become as shown in FIG. 7(E). That is, as shown in FIG. 7(A), the digital signals D0, D1, D2 and D3 of four (4) lines are inputted to the selection circuit 46. Then, the color filter arrangement on the solid-state image sensing device 12 is a mosaic fashion as shown in FIG. 7(A). That is, at the digital signal D3 (line D3), the color filter has an arrangement of G, R, G, R, . . . in the order from the left end pixel, and at the digital signal (line) D2, the color filter has an arrangement of B, G, B, G, . . . in the order from the left end pixel, and the digital signals (lines) D1 and D0 have the color filters have arrangements as that of the digital signals D3 and D2, respectively. Therefore, in the odd field, the digital signals D3, D2 and D1 are selected, and therefore, the pixels to be processed at the odd number pixel become as shown in FIG. 7(B), and so on.

The interpolation calculation in the even field will be described is referring FIG. 8. FIG. 8(A) shows nine (9) pixels utilized for the interpolation calculation of the odd number pixel, and therefore, FIG. 8(A) is corresponding to FIG. 7(B). FIG. 8(B) shows nine (9) pixels utilized for the interpolation calculation of the even number pixel, and the FIG. 8(B) is corresponding to FIG. 7(C). What can be evaluated by performing the interpolation calculation by utilizing the nine pixels are three (3) color signals of a center pixel (a specific pixel) in a pixel group shown in FIG. 8(A) or FIG. 8(B). In FIG. 8, in order to identify the nine (9) pixels arranged in a matrix fashion of 3×3, combinations of the color R, G and B outputted from the respective pixels and numerals (suffixes) representative of positions in the horizontal direction are utilized. "G22" is the center pixel of the nine (9) pixels, and a color signal from the pixel G22 is the G signal.

In processing the odd number pixel shown in FIG. 8(A), the horizontal interpolation circuit 62 outputs a signal G22 as it is as the color signal Gh as shown by the following equation (1). Since pixels B21 and B23 sandwiching the pixel G22 are of the B signals, the color signal Bh is obtained as an average of the signals B21 and B23 as shown by the following equation (2). A calculation method of the color signal Rh becomes more complex. More specifically, the G signal G12 of a pixel R12 is calculated as an averaged value of signals G11 and G13, and the color signal Rh is evaluated with a ratio of the signal G12 obtained and the signal G22 (following equation (3)). Because since a local variation of the color signal with respect to a variation of a luminance is small, a ratio of the G signal and the R signal or the B signal is approximately equal to each other between adjacent pixels.

$$Gh = G22 \tag{1}$$
$$Bh = (B21 + B23)/2 \tag{2}$$

$$Rh = \frac{G22 \times R12}{G12} = \frac{2G22 \times R12}{G11 + G13} \tag{3}$$

In a case of the odd pixel shown in FIG. 8(A), the vertical interpolation circuit 64 outputs the color signal G22 as the color signal Gv of the pixel G22 as shown by the following equation (4). Pixels R12 and R32 sandwiching the pixel G22 are of the R signals, and therefore, the color signal Rv is evaluated by performing the calculation of an average of the color signals R12 and R32 as shown by the following equation (5). As to the color signal Bv, a calculation method is similar to that of the above described color signal Rh. More specifically, the G signal G21 of the pixel B21 is calculated as an averaged value of the signals G11 and G31, and the color signal Bv is calculated with a ratio between the color signal G21 and the color signal G22 (following equation (6)).

$$Gv = G22 \quad (4)$$
$$Rv = (R12 + R32)/2 \quad (5)$$

$$Bv = \frac{G22 \times B21}{G21} = \frac{2G22 \times B21}{G11 + G31} \quad (6)$$

The interpolation calculation for the even pixel in the odd field shown in FIG. 8(B) is basically the same as the interpolation calculation for the odd pixel in the odd field shown in FIG. 8(A) while the pixels to be processed are changed. More specifically, the horizontal interpolation circuit 62 outputs the color signal B22 as it is as the color signal Bh of the pixel B22 as shown by the following equation (7). The color signal Gh of the B22 is evaluated by performing a calculation of an average of the color signals G21 and G23 of adjacent pixels G21 and G23 as shown by the following equation (8). As to the color signal Rh, the color signal R12 of a pixel G12 is evaluated by performing a calculation of an average of color signals R12 and R13, and then, by applying a ratio between the color signal Gh calculated by the equation (8) and the color signal G12 to the color signal R12, the color signal Rh is evaluated by the following equation (9).

$$Bh = B22 \quad (7)$$
$$Gh = (G21 + G23)/2 \quad (8)$$

$$Rh = \frac{G22 \times R12}{G12} = \frac{(G21 + G23)(R11 + R12)}{4G12} \quad (9)$$

In a case of FIG. 8(B), the vertical interpolation circuit 64 outputs the color signal B22 as it is according to the following equation (10) as the color signal Bv of the pixel B22. The color signal Gv is evaluated by performing a calculation of an average value of the color signals G12 and G32 of adjacent pixels G12 and G32 as shown by the following equation (11). The color signal R21 of the pixel G12 is evaluated by performing a calculation of an average of the color signals R11 and R31 of adjacent pixels R11 and R31, and then, by applying a ratio between the color signal G21 and the color signal Gh calculated according to the equation (11) to the color signal R21, the color signal Rv is calculated by the following equation (12).

$$Bv = B22 \quad (10)$$
$$Gv = (G12 + G32)/2 \quad (11)$$

$$Rv = \frac{R21 \times G22}{G21} = \frac{(R11 + R31)(G12 + G32)}{4G21} \quad (12)$$

In performing the interpolation calculation in the even field, it is possible to obtain the color signals Rh, Gh, Bh, Rv, Gv and Bv by performing the interpolation calculation similar to the above described equations (1)–(12). More specifically, as seen from comparison of FIG. 7(C) and FIG. 7(D), the pixels to be processed in the interpolation calculation of the odd pixel at the even field become pixels obtained by exchanging "R" and "B" of the pixels to be processed in the interpolation calculation of the even pixel at the odd field, and therefore, in the above described equations, only "R" and "B" may be exchanged to each other. Furthermore, as seen from comparison of FIG. 7(B) and FIG. 7(E), the pixels to be processed in the interpolation calculation of the even pixel at the even field become pixels obtained by exchanging "R" and "G" of the pixels to be processed in the interpolation calculation of the odd pixel at the odd field in the above described equations, and therefore, only "R" and "G" may be exchanged to each other.

$$Sv = |(G11+G13)/2 - (G31+G33)/2| \quad (13)$$
$$Sh = |(G11+G31)/2 - (G13+G33)/2| \quad (14)$$
$$Sv = |G12 - G32| \quad (15)$$
$$Sh = |G21 - G23| \quad (16)$$

In the correlation detection circuit 60, the above described equations (13)–(16) are utilized. That is, in the correlation detection circuit 60, by utilizing the pixels of the G signals the number of which is the largest within the pixels to be processed, a correlation value representative of a degree of a correlation of the specific pixel (center pixel) with respect to the adjacent pixels is calculated. A correlation value calculation of the odd pixel at the odd field shown in FIG. 8(A), the vertical correlation detection circuit 68 evaluates the vertical correlation value Sv by performing a calculation of an absolute value of a difference between the signals G12 and G32 of pixels R12 and R32 sandwiching the specific pixel G22 in the vertical direction according to the above described equation (13). Since the pixels R12 and R32 output the R signals, in fact, the signals G12 and G32 do not exist. Therefore, the signal G12 is calculated by the signals G11 and G13, and the signals G32 is calculated by the signals G31 and G33. In the horizontal correlation detection circuit 66, the correlation value Sh of the specific pixel G22 with respect to the adjacent pixels in the horizontal direction is calculated according to the above described equation (14). More specifically, the correlation value Sh is evaluated by performing a calculation of an absolute value of a difference between the signals G21 and G23 of the pixels B21 and B23. However, since the pixels B21 and B23 are B pixels, in fact, the signals G21 and G23 do not exist. Then, the signal G21 is calculated by the signals G23 is calculated by the signals G13 and G33.

Furthermore, in the correlation value calculation for the even pixel in the odd field shown in FIG. 8(B), the vertical correlation detection circuit 68 outputs an absolute value of a difference between the signals G12 and G32 according to the above described equation (15) as the correlation value Sv in the vertical direction. Furthermore, the horizontal correlation detection circuit 66 outputs an absolute value of a difference between the signals G21 and G23 according to the above described equation (16) as the correlation value Sh in the horizontal direction.

Since the arrangement pattern of the G pixels is the same in the even field, it is possible to calculate the correlation values Sv and Sh by utilizing the above described equations (13)–(16). However, it is necessary to note that the correlation value calculation for the even pixel at the odd field is the same as the correlation value calculation for the odd pixel at the even field, and the correlation value calculation for the odd pixel at the odd field is the same as the correlation value calculation for the even pixel at the even field.

Thus, the vertical direction correlation value Sv and the horizontal direction correlation value Sh are outputted from the correlation detection circuit 60. Each of the correlation values Sv and Sh becomes small when the correlation is strong, and becomes large when the correlation is weak.

The coefficient calculation circuit 70 calculates the horizontal weighing coefficient Kh and the vertical weighing coefficient Kv on the basis of the correlation values Sh and Sv outputted from the correlation detection circuit 60 in accordance with the following equations (17) and (18). However, the weighing coefficients Kh and Kv have a relationship of Kh+Kv=1.

$$Kh=Sv/(Sh+Sv) \qquad (17)$$

$$Kv=Sh/(Sh+Sv) \qquad (18)$$

Therefore, the horizontal weighing coefficient Kh becomes large in a case where the correlation in the horizontal direction is stronger than the correlation in the vertical direction, that is, in a case where the correlation value Sh is smaller than the correlation value Sv. The vertical weighing coefficient Kv becomes large in a case where the correlation in the vertical direction is stronger than the correlation in the vertical direction, that is, in a case where the correlation value Sv is smaller than the correlation value Sh. Such the weighing coefficients Kh and Kv are applied to the weighted addition circuit 72. Therefore, in the weighted addition circuit 72, by taking the horizontal correlation and the vertical correlation of the specific pixel with respect to the pixels around the specific pixel into consideration, the weighted addition operations of the color signals Gh, Rh and Bh and Gv, Rv and Bv are performed, respectively. Therefore, it is possible to prevent the false color signal from being produced.

With referring FIG. 9, a case where a white incident light shown in FIG. 9(A) is applied to the specific pixel and the pixels around the specific pixel in FIG. 2 embodiment is assumed. The incident light of FIG. 9(A) shows an cage having no color component and only a luminance level of which is changed. Therefore, originally, the levels of the color signals R, G and B become the same level. FIG. 9(B) illustratively shows the signal levels from the respective pixels, and an upper view of FIG. 9(B) shows the odd pixel, and a lower view of FIG. 9(B) shows the even pixel. Results calculated in accordance with the above described equations (1)–(18) are shown in FIG. 9(C). Then, the output color signals Go, Ro and Bo obtained by performing the weighted addition with using the weighing coefficients Kh and Kv in the weighted addition circuit 72 are shown in FIG. 9(D). As seen from FIG. 9(D), the levels of the color signals Go, Ro and Bo at the specific pixel, i.e., the center pixel of nine (9) pixels are equal to each other and become "0.2". The color signal levels of the specific pixel shown in FIG. 9(B) are also "0.2", and therefore, it will be understood that according to FIG. 2 embodiment, the false color signal is prevented from being produced.

Figure 10:
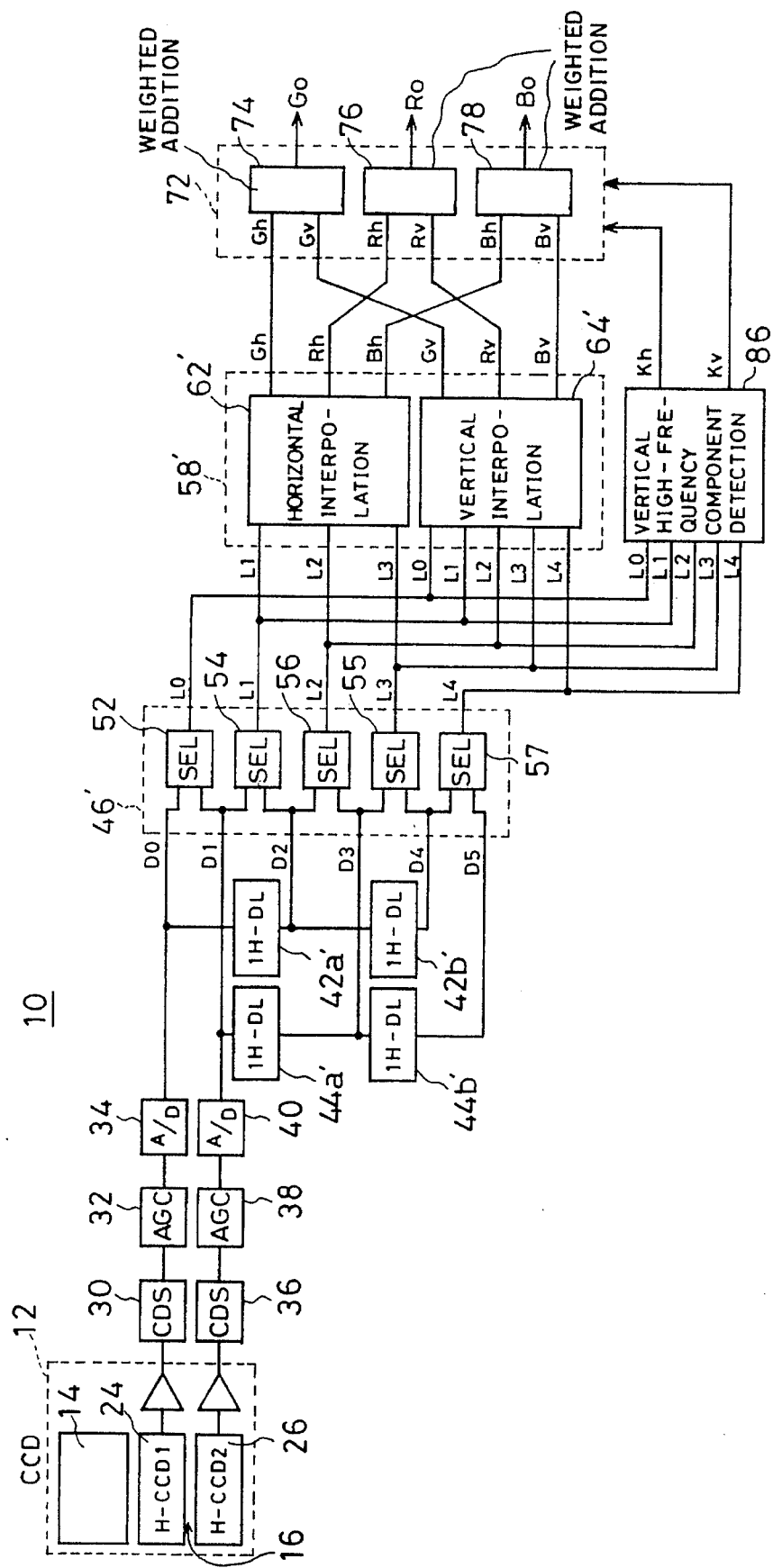
FIG. 10 is a block diagram showing another embodiment according to the present invention.
Figure 11:
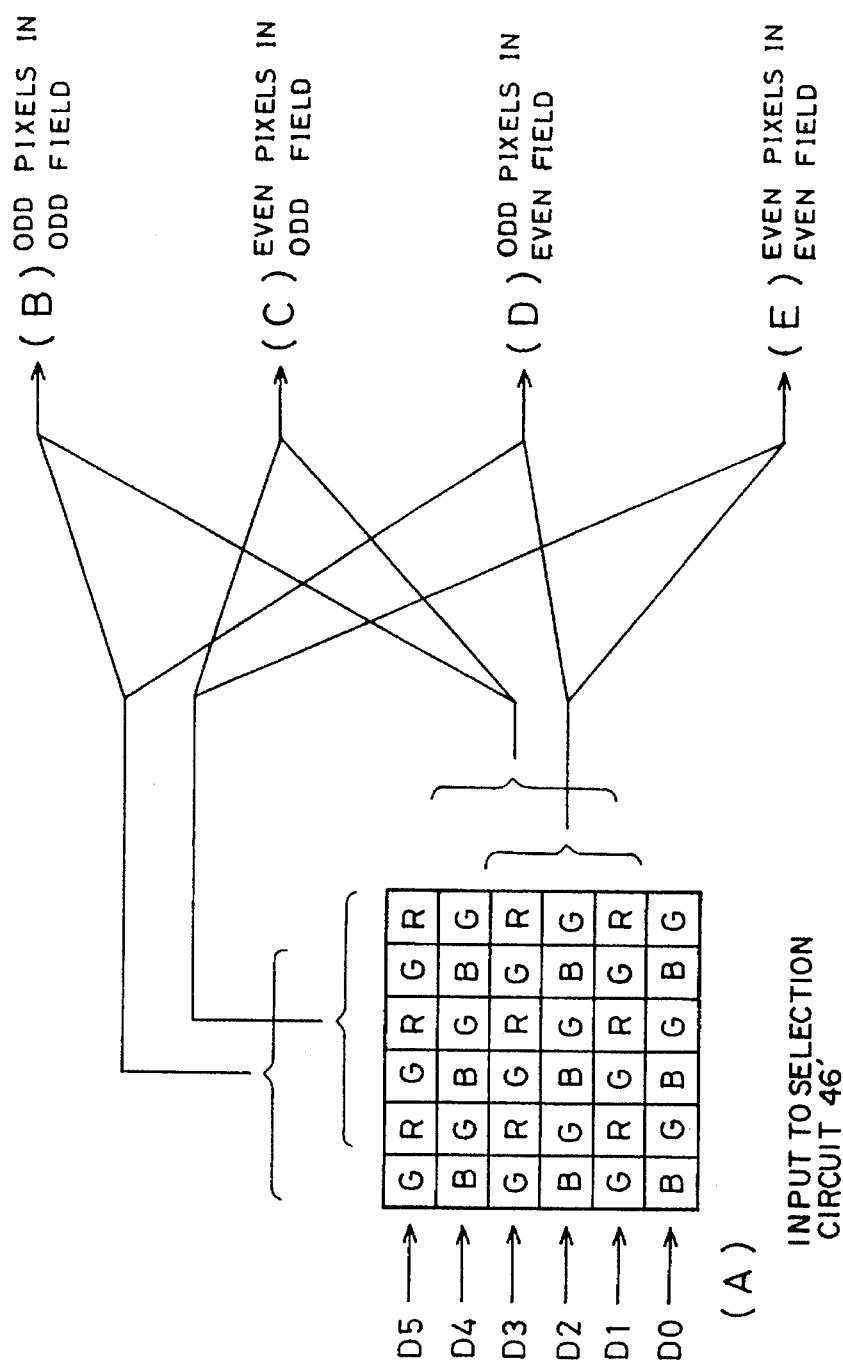
FIG. 11 is an illustrative view showing selection of pixels to be processed in FIG. 10 embodiment.

Next, FIG. 10 is a block diagram showing a second embodiment according to the present invention, In FIG. 10, the same or similar reference numerals are applied to the same or similar components as that of FIG. 2 embodiment, and a duplicate description will be omitted here. In different from FIG. 2 embodiment, in FIG. 10 embodiment, pixels to be processed for interpolation are fifteen (15) pixels. More specifically, in FIG. 10 embodiment, when the interpolation calculation suitable for a case where the correlation in the horizontal direction is strong, as shown in FIG. 11, five (5) pixels in the horizontal direction and three (3) pixels in the vertical direction are selected. When the interpolation calculation suitable for a case where the correlation in the vertical direction is strong, as shown in FIG. 12, three (3) pixels in the horizontal direction and five (5) pixels in the vertical direction are selected.

Then, in FIG. 10 embodiment, the digital signals of two (2) lines obtained from the solid-state image sensing device 12 and thus the A/D converters 34 and 40 are applied to two (2) 1 H delay circuits 42a' and 44a' and outputs of the 1 H delay circuits 42a' and 44a' are applied to further two (2) 1 H delay circuits 42b' and 44b', respectively. Digital signals D0, D1, D2, D3, D4 and D5 from the A/D converters 34 and 40, the 1 H delay circuits 42a' and 44a', and the 1 H delay circuits 42b' and 44b' are simultaneously applied to a selection circuit 46'. As similar to FIG. 2 embodiment, the selection circuit 46' includes a plurality of selectors 52, 54, 56, 55 and 57, and according to selection methods different from each other in accordance with the odd field or the even field, output digital signals L0–L4 are selected from the input digital signals D0–D5.

Specifically, at the odd field, the selection circuit 46' outputs the digital signals D1, D2, D3, D4 and D5 as the output signals L0, L1, L2, L3 and L4. At the even field, the selection circuit 46' outputs the digital signals D0, D1, D2, D3 and D4 as the output signals L0, L1, L2, L3 and L4. The output digital signals L0–L4 selected by the selection circuit 46' are applied to a vertical interpolation circuit 64' included in an interpolation circuit 58' and to a vertical high-frequency component detection circuit 86. In addition, the output signals L1, L2 and L3 are applied to a horizontal interpolation circuit 62' included in the interpolation circuit 58'.

Pixels to be processed in the horizontal interpolation circuit 62' become different according to the even field or the odd field, and the odd pixel or the even pixel. More specifically, FIG. 11 shows the pixels to be processed in the horizontal interpolation circuit 62', and the input signals (pixels) to the selection circuit 46' are shown in FIG. 11(A). In a case where the interpolation calculation for the odd pixel is performed at the odd field, in the vertical direction, the signals D4, D3 and D2, that is, the lines D4, D3 and D1 of FIG. 11(A) are selected, and in the horizontal direction, five (5) pixels are selected. In a case where the even pixel is to be processed at the odd field, as shown in FIG. 11(C), the signals (lines) D3, D2 and D1 of FIG. 11(A) are selected in the vertical direction, and five (5) pixels are selected in the horizontal direction. In a case where the interpolation calculation for the odd pixel at the even field, as shown in FIG. 11(D), the signals (lines) D3, D2 and D1 shown in FIG. 11(A) are selected in the vertical direction, and five (5) pixels are selected in the horizontal direction. In a case where the even pixel is to be processed at the even field, as shown in FIG. 11(E), the signals (lines) D3, D2 and D1 of FIG. 11(A) are selected in the vertical direction, and five (5) pixels are selected in the horizontal direction.

Furthermore, in the vertical interpolation circuit 64', in a case where the interpolation calculation for the odd pixel at the odd field, as shown in FIG. 12(B), the signals, i.e., the lines D5, D4, D3, D2 and D1 of FIG. 12(A) are selected in the vertical direction, and three (3) pixels are selected in the horizontal direction. In a case where the even pixel is to be processed at the odd field, as shown in FIG. 12(C), the signals D5, D4, D3, D2 and D1 of FIG. 12(A) are selected in the vertical direction, and in the horizontal direction, three (3) pixels different from that of FIG. 12(B) are selected, In a case where the interpolation calculation for the odd pixel at the even field, as shown in FIG. 12(D), the signals D4, D3, D2, D1 and D0 of FIG. 12(A) are selected in the vertical direction, and three (3) pixels being the same as that of FIG. 12(B) are selected in the horizontal direction. Then, in a case where the interpolation calculation for the even pixel at the even field, as shown in FIG. 12(E), the signals (lines) D4, D3, D2, D1 and D5 of FIG. 12(A) are selected in the vertical direction, and three (3) pixels being the same as that of FIG. 12(C) are selected in the vertical direction.

Then, in the horizontal interpolation circuit 62', fifteen (15) pixels shown in FIG. 13 are utilized, As described previously, the signals of three (3) lines in the vertical direction and the signals of five (5) pixels in the horizontal direction are inputted to the horizontal interpolation circuit 62', and the horizontal interpolation circuit 62' performs the interpolation calculation of the color signals of a center pixel, i.e., a specific pixel having a suffix of "23".

First, in the interpolation calculation for the odd pixel shown in FIG. 13(A), the horizontal interpolation circuit 62' outputs a signal G23 of the specific pixel G23 as it is according to the following equation (19) as the color signal Gh.

$$Gh = G23 \quad (19)$$

The color signal Rh is calculated by utilizing the signals G21, R22, G23, R24 and G25 in a second line. At this time, a first nature that the color signal is not changed in a narrow area, and a second nature that a ratio of a low-frequency component of a specific color signal (a color signal in a wide area) and a high-frequency component (a color signal at the specific pixel) becomes the same in another color component. That is, a relationship indicated by the following equation (20) is satisfied in the second line in FIG. 13(A).

$$\frac{G23}{G21 + 2 \times G23 + G25} = \frac{R23}{(R22 + R24) \times 2} \quad (20)$$

In the equation (20), a left side is representative of a ratio of a low-frequency component and a high-frequency component of the G signal, and a right side is representative of a low-frequency component and a high-frequency component of the R signal. Coefficients "2" existing in denominators of the both sides are introduced for making the magnitudes of the denominators coincident with each other. By modifying the equation (20), the following equation (21) is obtainable.

$$R23 = \frac{G23 \times 2(R22 + R24)}{(G21 + 2 \times G23 + G25)} \quad (21)$$

A G signal G13 at a pixel B13 in a first line of FIG. 13(A) and a G signal G23 at a pixel B33 in a third line can be obtained by the following equations (22) and (23) as similar to the signal R23.

$$G13 = \frac{B13 \times 2(G12 + G14)}{(B11 + 2 \times B13 + B15)} \quad (22)$$

$$G33 = \frac{B33 \times 2(G32 + G34)}{(B31 + 2 \times B33 + B35)} \quad (23)$$

Then, the R signal Rh at the specific pixel G23 is obtained by the following equation (24), and the B signal Bh is obtained by the following equation (25).

$$Rh = R23 \quad (24)$$

$$Bh = \frac{G23 \times B13}{G13} \quad (25)$$

As similar to the interpolation calculation for the odd pixel, in the interpolation calculation for the even pixel shown in FIG. 13(B), the color signals Gh, Rh and Bh can be obtained in accordance with the following equations (26)–(31).

$$Gh = G23 \quad (26)$$

$$B13 = \frac{G13 \times 2(B12 + B14)}{(G11 + 2 \times G13 + G15)} \quad (27)$$

$$G23 = \frac{R23 \times 2(G22 + G24)}{(R21 + 2 \times R23 + R25)} \quad (28)$$

$$B33 = \frac{G33 \times 2(B32 + B34)}{(G31 + 2 \times G33 + G35)} \quad (29)$$

$$Rh = R23 \quad (30)$$

$$Bh = \frac{G23 \times B13}{G13} \quad (31)$$

In addition, since the interpolation calculation in the vertical interpolation circuit 64' shown in FIG. 10 is similar to the interpolation calculation in the horizontal interpolation circuit 62' as described above, a detailed description will be omitted here.

Thus, since the number of pixels utilized for the interpolation calculation in FIG. 10 embodiment is larger than that of FIG. 2 embodiment, it is possible to calculate the color signals more accurately.

The vertical high-frequency component detection circuit 86 in FIG. 10 embodiment, which is utilized for a correlation detection circuit detects a high-frequency component in the vertical direction at the specific pixel and the pixels around the specific pixel on the basis of the digital signals L0, L1, L2, L3 and L4 applied from the selection circuit 46'. Therefore, the vertical high-frequency component detection circuit 86 is specifically composed of a digital high-pass filter. Then, the vertical high-frequency component detection circuit 86 outputs the weighing coefficients Kh and Kv similar to that of FIG. 2 embodiment. At this time, when the vertical high-frequency component is large, the horizontal weighing coefficient Kh is made large, and when the vertical high-frequency component is small, the horizontal weighing coefficient Kh is made small. Then, the vertical weighing coefficient Kv is obtained by "1-Kh". That is, a fact that the high-frequency component in the vertical direction is large means that the correlation in the vertical direction is small.

Thus, the weighted addition circuit 72 receives the color signals Gh, Rh, Bh and Gv, Rv and Bv from the interpolation circuit 58', and the weighing coefficients Kh and Kv from the vertical high-frequency component detection circuit 86. Therefore, as similar to FIG. 2 embodiment, the weighted addition circuit 72 outputs the color signals Go, Ro and Bo of the specific pixel (the center pixel shown in FIG. 13, for example).

In addition, in FIG. 10 embodiment, in order to evaluate the weighing coefficients Kh and Kv, the high-frequency component in the vertical direction is detected; however, by detecting a high-frequency component in the horizontal direction, the weighing coefficient Kv may be determined, and then, the weighing coefficient Kh may be evaluated according to "1-Kv". Furthermore, as similar to FIG. 2 embodiment, the weighing coefficients Kh and Kv may be individually evaluated in the horizontal direction and the vertical direction. In such a case, a horizontal direction high-frequency component detection circuit and a vertical direction high-frequency component detection circuit may be utilized.

Next, a third embodiment according to the present invention shown in FIG. 14 will be described. FIG. 14 embodiment is similar to FIG. 2 embodiment except the following points. More specifically, in FIG. 2 embodiment, only the G signal is utilized in the correlation detection circuit 60, but FIG. 14 embodiment is further provided with correlation detection circuits which calculate correlation values with utilizing all the color signals, and a color level detection circuit, whereby a mixing ratio of the correlation values evaluated from the G signal and the correlation values evaluated from all the color signals is controlled in accordance with a color level.

More specifically, as well seen from FIG. 7, for example, the number of pixels of "G" is only a half the number of all the pixels, and therefore, if the correlation detection is performed with utilizing only the G signals, an erroneous detection may occur. In order to resolve such a problem, it is necessary to use all the color signals, i.e., all the pixels. However, if the pixels of B and R are used, it is possible to perform an accurate detection because the R, G and B can be regarded as the luminance when an image is a monochrome image or the color level of an image is low, but when the color level is high, there is an occasion that an accurate correlation detection can not be performed because the R, G and B can not be regarded as the luminance.

Then, in FIG. 14 embodiment, when the color level is low, all the pixels are utilized for detecting the correlation, and when the color level is high, the correlation detection is performed by using only the pixels of G. That is, in FIG. 14 embodiment, the correlation detection circuit 60' is different from the correlation detection circuit 60 of FIG. 2 embodiment. The correlation detection circuit 60' includes a first horizontal correlation detection circuit 66a' and a second horizontal correlation detection circuit 66b', and a first vertical correlation detection circuit 68a' and a second vertical correlation detection circuit 68b'. The first correlation detection circuits 66a' and 68a' are the same as the correlation detection circuits 66 and 68 of FIG. 2 embodiment. Then, the second correlation detection circuits 66b' and 68b' are circuits for detecting the correlations by utilizing the color signals from all the pixels. The correlation detection circuit 60' further includes the color level detection circuit 88 and a coefficient calculation circuit 89. A coefficient outputted from the coefficient calculation circuit 89 is applied to multipliers 90 and 92. To adders 94 and 96, the correlation values Sh1 and Sv1 from the first horizontal correlation detection circuit 66a' and the first vertical correlation detection circuit 68a' are further applied. To the multipliers 90 and 92, correlation values Sh2 and Sv2 from the second horizontal correlation detection circuit 66b' and the second vertical correlation detection circuit 68b' are further applied, and an output of the multiplier 90 is applied to the adder 94, and an output of the multiplier 92 is applied to the adder 96. Therefore, as similar to FIG. 2 embodiment, the correlation values Sh and Sv can be outputted from the adders 94 and 96.

In FIG. 14 embodiment, the first horizontal correlation detection circuit 66a' and the first vertical correlation detection circuit 68a' are completely the same as the circuits 66 and 68 of FIG. 2 embodiment, and therefore, as described previously, the circuits 66a' and 68a' output the correlation values Sh1 and Sv1 according to the equations (13)–(16). Furthermore, the second horizontal correlation detection circuit 66b' and the second vertical correlation detection circuit 68b' calculate the correlation values Sh2 and Sv2 on the basis of all the pixels and according to the following equations (32) and (33). More specifically, in order to evaluate the correlation values in the horizontal direction and the vertical direction at a center pixel (a specific pixel) of nine (9) pixels shown in FIG. 15, the second correlation detection circuits 66b' and 68b' use all of the nine (9) pixels including the specific pixel $D_{22}$. In addition, the equations (32) and (33) are not to be changed in spite of the odd field or the even field, and the odd pixel or the even pixel.

$$Sh2=|(D_{11}+2\times D_{21}+D_{31})-(D_{12}+2\times D_{22}+D_{32})|+|(D_{12}+2\times D_{22}+D_{32})-(D_{13}+2\times D_{23}+D_{33})| \quad (32)$$

$$Sv2=|(D_{11}+2\times D_{12}+D_{13})-(D_{21}+2\times D_{22}+D_{23})|+|(D_{21}+2\times D_{22}+D_{23})-(D_{31}+2\times D_{32}+D_{33})| \quad (33)$$

Then, the correlation values Sh2 and Sv2 are multiplied by the coefficient from the coefficient calculation circuit 89 in the multipliers 90 and 92, and then, applied to the adders 94 and 96, respectively.

Now, the coefficient outputted from the coefficient calculation circuit 89 will be described. The digital signals from the A/D converters 34 and 40 are supplied to the color level detection circuit 88. In the color level detection circuit 88, a sum of two color difference signals G-R and G-B is evaluated for each pixel, and a value totalizing the sums of the nine (9) pixels is outputted as a color level. The color level is applied to the coefficient calculation circuit 89. The coefficient calculation circuit 89 outputs the coefficient which is in inverse proportion to the input color level. More specifically, at a time of a monochrome image or an image having a low color level, the coefficient being approximately "1" is outputted, and the coefficient approaches "0" as the color level becomes high. Therefore, a mixing ratio of the correlation values Sh1 and Sh2 and a mixing ration of the correlation values Sv1 and Sv2 in the adders 94 and 96 are changed according to the coefficient. That is, when the color level is low, the mixing ratios of the correlation values Sh2 and Sv2 with respect to the correlation values Sh1 and Sv1 are large, and when the color level is high, the mixing ratio of the correlation values Sh1 and Sv1 with respect to the correlation values Sh2 and Sv2 are large.

Next, another embodiment in which the interpolation calculation is performed on the basis of a principle different from that of FIG. 2 embodiment or FIG. 9 embodiment will be described. In FIG. 2 embodiment or FIG. 9 embodiment, as described previously, the first nature that the ratio of the G signal and the R signal or the B signal is approximately equal to each other between the adjacent pixels because the local variation of the color signal is small with respect to the variation of the luminance, and the second nature that the ratio of a low-frequency component and a high-frequency component of a specific color component is equal to a ratio in another color component are utilized. In contrast, in this another embodiment, time above described first nature and a third nature that a difference between the low-frequency component and the high-frequency component of the specific color component is equal to a difference of that of another color component. Therefore, this another embodiment has the same structure as that of FIG. 10 embodiment; however, calculation methods in the horizontal interpolation circuit 62 and the vertical interpolation circuit 64 are different from that of FIG. 10 embodiment.

More specifically, the interpolation calculation in the horizontal interpolation circuit 62 is performed on the basis of FIG. 13. First, in the interpolation calculation for the odd pixel at the odd field, as indicated by the following equation (34), the horizontal interpolation circuit 62 outputs the signal G23 of the specific pixel G23 as it is. The R signal is calculated by utilizing the signals from the pixels G21, R22, G23, R24 and G25 of a second line shown in FIG. 13(A). At this time, the third nature that the difference between the low-frequency component and the high-frequency component of the specific color component is equal to the difference in the other color component is utilized. That is, in the second line, a relationship represented by the following equation (35) is satisfied.

$$Gh = G23 \quad (34)$$

$$G23 - \frac{G21 + 2G23 + G25}{4} = R23 - \frac{R22 + R24}{2} \quad (35)$$

In the equation (35), a left side is representative of the difference between the high-frequency component and the low-frequency component of the G signal, and a right side is representative of the difference between the high-frequency component and the low-frequency component of the R signal. By modifying the equation (35), the following equation (36) is obtainable. Likewise, a signal G13 at a pixel B13 in a first line of FIG. 13(A) and a signal G33 at a pixel B33 in a third line of FIG. 13(A) can he calculated according to the following equations (37) and (38). Then, the R signal Rh can be calculated according to the following equation (39).

$$R23 = G23 + \frac{R22 + R24}{2} - \frac{G21 + 2G23 + G25}{4} \quad (36)$$

$$G13 = B13 + \frac{G12 + G14}{2} - \frac{B11 + 2B13 + B15}{4} \quad (37)$$

$$G33 = B33 + \frac{G32 + G34}{2} - \frac{B31 + 2B33 + B35}{4} \quad (38)$$

$$Rh = R23 \quad (39)$$

Then, in order to evaluate the B signal Bh, the third nature that the difference between the G signal and the R signal or the B signal is approximately the same between the adjacent pixels is utilized. That is, a relationship represented by the following equation (40) is satisfied.

$$B23 - G23 = B13 - G13 \quad (40)$$

By modifying the equation (40), it is possible to calculate the B signal Bh according to the following equation (41).

$$Bh = G23 + B13 - G13 \quad (41)$$

In addition, in the interpolation calculation for the even pixel at the odd field shown in FIG. 13(B), a detailed description is omitted here, but the signals Gh, Rh and Bh can be calculated according to the following equations (42)–(47).

$$Gh = G23 \quad (42)$$

$$G23 = R23 + \frac{G22 + G24}{2} - \frac{R21 + 2R23 + R25}{4} \quad (43)$$

$$B13 = G13 + \frac{B12 + B14}{2} - \frac{G11 + 2G13 + G15}{4} \quad (44)$$

$$B33 = G33 + \frac{B32 + B34}{2} - \frac{G31 + 2G33 + G35}{4} \quad (45)$$

$$Rh = R23 \quad (46)$$
$$Bh = G23 + B13 - G13 \quad (47)$$

In addition, calculation methods of the color signals Gv, Rv and Bv in the vertical interpolation circuit 68 are basically the same as that of the horizontal interpolation circuit 66, and therefore, a duplicate description will be omitted here.

Thus, in accordance with the above described another embodiment, multiplication operations and division operations are utilized for the interpolation calculation in FIG. 10 embodiment, but the interpolation calculation can be performed only addition operations and subtraction operations, and therefore, a circuit configuration becomes simple. Especially, no division operation by which the circuit configuration becomes complex is utilized, the digital calculation circuit 84 of FIG. 6 can be made largely simple.

Furthermore, according to the above described another embodiment, the false color signal is few with respect to an image of a monotone, and therefore, an image with a high quality is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color video camera, comprising:

a solid-state image sensing device having a large number of pixels arranged in a matrix fashion and color filters arranged in a mosaic fashion;

an interpolation processing circuit which performs an interpolation calculation on the basis of color signals of a specific pixel and a plurality of pixels around the specific pixel outputted from the solid-state image sensing device, and outputs a plurality of color signals of said specific pixels; and an interpolation control circuit which controls said interpolation processing circuit in accordance with a correlation of said specific pixel with respect to said plurality of pixels, wherein said interpolation processing circuit includes a horizontal interpolation circuit which performs an interpolation calculation in a horizontal direction on the basis of the color signals from said specific pixel and said plurality of pixels and outputs a plurality of horizontal color signals, a vertical interpolation circuit which performs an interpolation calculation in a vertical direction on the basis of the color signals from said specific pixel and said plurality of pixels and outputs a plurality of vertical color signals, and a weighted addition circuit for adding said horizontal color signals and said vertical color signals to each other for each color, said interpolation control circuit includes a coefficient output circuit which outputs at least one of a weighing coefficient for said horizontal color signals and a weighing coefficient for said vertical color signals, said at least one of weighing coefficients being applied to said weighted addition circuit.

2. A color video camera according to claim 1, wherein said coefficient output circuit outputs at least one of the horizontal weighing coefficient and the vertical weighing coefficient on the basis of at least one of a horizontal correlation of said specific pixel with respect to said plurality of pixels and a vertical correlation of said specific pixel with respect to said plurality of pixels.

3. A color video camera according to claim 2, wherein said coefficient output circuit includes a horizontal correlation detection circuit which calculates a horizontal correlation value of said specific pixel with respect to said plurality of pixels on the basis of the color signals from said specific pixel and said plurality of pixels, a vertical correlation detection circuit which calculates a vertical correlation value of said specific pixel with respect to said plurality of pixels on the basis of the color signals from said specific pixel and said plurality of pixels, and a coefficient calculation circuit which calculates at least one of said horizontal weighing coefficient and said vertical weighing coefficient on the basis of at least one of said horizontal correlation value and said vertical correlation value.

4. A color video camera according to claim 3, wherein said horizontal correlation detection circuit includes a first horizontal correlation circuit which calculates a first horizontal correlation value on the basis of the color signals of a specific color, and a second horizontal correlation circuit which calculates a second horizontal correlation value on the basis of all the color signals, and said coefficient output circuit includes a color level detection circuit which detects a color level on the basis of the signal from said solid-state image sensing device, and a horizontal weighted addition circuit which performs a weighted addition of said first horizontal correlation value and said second horizontal correlation value according to said color level and outputs said horizontal weighing coefficient.

5. A color video camera according to claim 4, wherein said vertical weighted addition circuit includes a first coefficient calculation circuit which outputs a coefficient for said second vertical correlation value on the basis of said color level, a vertical multiplication circuit which performs a multiplication of said second vertical correlation value and said coefficient from said first coefficient calculation circuit, and a first addition circuit which performs an addition of an output of said vertical multiplication circuit and said first vertical correlation value.

6. A color video camera according to claim 4, wherein said horizontal weighted addition circuit includes a first coefficient calculation circuit which outputs a coefficient for said second horizontal correlation value on the basis of said color level, a horizontal multiplication circuit which performs a multiplication of said second horizontal correlation value and said coefficient from said first coefficient calculation circuit, and a first addition circuit which performs an addition of an output of said horizontal multiplication circuit and said first horizontal correlation value.

7. A color video camera according to claim 3, wherein said vertical correlation detection circuit includes a first vertical correlation circuit which calculates a first vertical correlation value on the basis of the color signals of a specific color, and a second vertical correlation circuit which calculates a second vertical correlation value on the basis of all the color signals, and said coefficient output circuit includes a color level detection circuit which detects a color level on the basis of the signal from said solid-state image sensing device, and a vertical weighted addition circuit which performs a weighted addition of said first vertical correlation value and said second vertical correlation value according to said color level and outputs said vertical weighing coefficient.

8. A color video camera according to claim 2, wherein said coefficient output circuit includes a filter which outputs at least one of said horizontal weighing coefficient and said vertical weighing coefficient on the basis of a high-frequency component of the color signal of said specific pixel and the color signals of said plurality of pixels.

9. A color video camera according to claim 8, wherein said filter includes a filter circuit which outputs said horizontal weighing coefficient and said vertical weighing coefficient on the basis of a vertical high-frequency component of the color signal of said specific pixel and the color signals of said plurality of pixels.

10. A color video camera according to claim 8, wherein said filter includes a filter circuit which outputs said horizontal weighing coefficient and said vertical weighing coefficient on the basis of a horizontal high-frequency component of the color signal of said specific pixel and the color signals of said plurality of pixels.

11. A color video camera according to claim 8, wherein said filter includes a first filter circuit which outputs said horizontal weighing coefficient oil the basis of a horizontal high-frequency component of the color signal of said specific pixel and the color signals of said plurality of pixels, and a second filter circuit which outputs said vertical weighing coefficient on the basis of a vertical high-frequency component of the color signal of said specific pixel and the color signals of said plurality of pixels.

* * * * *